(12) United States Patent
Pluymers et al.

(10) Patent No.: US 7,508,338 B2
(45) Date of Patent: Mar. 24, 2009

(54) ANTENNA WITH COMPACT LRU ARRAY

(75) Inventors: Brian Pluymers, Haddonfield, NJ (US);
Marc T. Angelucci, Cherry Hill, NJ (US); John Fraschilla, Hainesport, NJ (US); Stuart R. Ducker, IV, Hainesport, NJ (US); Thomas E. McGuigan, Neptune City, NJ (US); Robert B. Lewis, Hainesport, NJ (US); Richard J. Heinrich, Marlton, NJ (US); Daniel W. Harris, Mount Laurel, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 119 days.

(21) Appl. No.: 11/584,470

(22) Filed: Oct. 20, 2006

(65) Prior Publication Data
US 2008/0169973 A1    Jul. 17, 2008

(51) Int. Cl.
*G01S 13/00*    (2006.01)
*H01Q 3/00*    (2006.01)
*H05K 7/20*    (2006.01)

(52) U.S. Cl. ............ 342/175; 342/368; 361/688; 361/699; 361/702

(58) Field of Classification Search ............. 342/175, 342/368; 343/824, 872; 361/600, 679, 688–722
See application file for complete search history.

(56) References Cited

U.S. PATENT DOCUMENTS

| 4,044,396 | A | * | 8/1977 | Haws et al. ............... 361/698 |
| 4,998,181 | A | * | 3/1991 | Haws et al. ............... 361/702 |
| 5,431,582 | A | * | 7/1995 | Carvalho et al. .......... 439/372 |
| 5,459,474 | A | * | 10/1995 | Mattioli et al. ........... 343/702 |
| 6,469,671 | B1 | * | 10/2002 | Pluymers et al. .......... 343/702 |
| 6,975,267 | B2 | * | 12/2005 | Stenger et al. ............ 342/371 |

* cited by examiner

*Primary Examiner*—Thomas H Tarcza
*Assistant Examiner*—Peter M Bythrow
(74) *Attorney, Agent, or Firm*—Duane Morris LLP

(57) ABSTRACT

An element support and thermal control arrangement for an active array antenna, preferably modular, using line-replaceable units (LRUs), includes a radiating-side liquid-cooled cold plate lying parallel with a liquid-cooled TR coldplate. Antenna elements are supported and cooled by the radiating cold plate, and a beamformer lies between the radiating and TR coldplates. A plurality of column coldplates are attached to the rear of the TR coldplate and define bays or volumes in which power LRUs can be fitted in thermal communication with the TR coldplate, the column coldplates, or both.

5 Claims, 11 Drawing Sheets

ANTENNA WITH COMPACT LRU ARRAY

FIELD OF THE INVENTION

This invention relates to a packaging arrangement for the various elements of an array antenna, especially an active array antenna.

BACKGROUND OF THE INVENTION

A great deal of commerce is currently aided by the use of electromagnetic communication, and electromagnetics are widely used for sensing, as for example in radar systems. Such radar systems may be used for monitoring the flight path of an aircraft from the aircraft itself for weather and object monitoring, monitoring the airspace around an airport for traffic control purposes, distance and acceleration monitoring between automobiles, and for military purposes. Reflector-type antennas have been, and still are, widely used for obtaining the high gain desired for communication with distant locations, and to obtain a narrow radar antenna beam to allow objects to be located with more precision than if a broad antenna beam were used. Reflector-type antennas are subject to some disadvantages, especially when the antenna beam must be scanned rapidly. Since the direction of the antenna beam as generated by a reflector antenna depends upon the physical position of the reflector, the reflector itself must be physically moved in order to scan the antenna beam. For simple area surveillance, this is not a problem, because the reflector antenna can simply be rotated at a constant speed to recurrently scan the surrounding area.

In those cases requiring antenna beam agility, reflector antennas are less satisfactory, because the inertia of the antenna results in the need to apply large forces to obtain the necessary accelerations and decelerations. In addition to being costly to operate, the physical stresses on the structure tend to lead to early failure or increased need for maintenance.

As a consequence of these and other disadvantages of reflector-type antennas, attention has been given to the use of array antennas, in which multiple antenna elements or ant elements are arrayed to define a larger radiating aperture, and fed from a common source. In order to achieve beam agility, each antenna element (or groups of antenna elements) is/are associated with controllable phase shifters. In order to improve the range of the communications or of the radar using the phaseshift-controllable array antenna, each antenna element may be associated with a power amplifier, a low-noise receiving amplifier, or both. The combination of the controllable phase shifter for each antenna element, the low-noise receiving amplifier, and the power amplifier, are often combined into a "transmit-receive" (TR) module, together with various switch and control elements, so that modular electronics can be used with the modular antenna elements of the array. U.S. Pat. No. 3,339,086, issued Aug. 16, 1994 in the name of DeLuca et al. describes a phased array antenna in which each elemental antenna element is associated with a transmit/receive (TR) module, but does not describe the physical nature of the structure.

With the increasing range and performance requirements of modern equipments, the power-handling capabilities of the power amplifiers of each of the TR modules of an array antenna have tended to increase. The reliability of electronic equipment tends to be degraded by operation at high temperatures. The increase in power required to be handled by the power amplifiers of TR modules, in turn, leads to the problem of carrying away the additional heat associated with the higher power, so as to keep the electronics at a low, and therefore reliable, temperature. U.S. Pat. No. 5,459,474, issued Oct. 17, 1995 in the name of Mattioli et al. describes an array antenna in which the electronics associated with a column of arrays are in the form of TR modules mounted on a coolant-fluid-carrying cold plate of a slide-in carrier. In the Mattioli et al arrangement, each slide-in carrier has a width no greater than the spacing between adjacent antenna elements. Heat is carried away from each slide-in carrier by coolant flow through a set of hoses, which allow the carriers to be slid toward and away from the antenna array for maintenance. The mounting of a large number of TR modules directly to the cold plate may be disadvantageous, as the entire cold plate must be taken out of service in order to work on or replace a single TR module. The changing out of a defective TR module is complicated by the mechanical fasteners and thermal joining material, or the epoxy bond, often used to provide good physical and thermal mounting of the TR module to the cold plate.

It is desirable to mount small numbers of the TR modules on Line-Replaceable Units (LRUs), which in turn are mounted to the cold plate. The number of TR modules which are mounted on each LRU depends upon a number of factors, among which one major factor is the availability of small-volume, efficient, reasonable-cost power supplies. That is to say, LRUs with but a single TR module may require a power supply which has excess capability for that one TR module, and an array of such LRUs would therefore contain more volume of power supplies than needed. Since volume is a consideration in an array situation, one TR module per LRU might be considered to be undesirable. Similarly, a very large number of TR modules on a single LRU tends to reduce the advantage of a line-replaceable unit, as removal of the LRU takes a large number of TR modules off-line, to the detriment of array operation. With such an arrangement, maintenance on a single TR module can be effected by simply replacing the LRU requiring repair or maintenance with a replacement unit, whereupon the maintenance can be performed off-line while the electronic system or radar continues in operation. Even with the LRU missing, the array can still remain in operation although with degraded capability.

U.S. Pat. No. 6,469,671 describes a system in which a generally planar active array antenna includes a plurality of transmit-receive (TR) modules arrayed in an array direction on a generally planar heat-conducting baseplate of a line-replaceable unit (LRU). Heat is coupled from the TR modules to their associated baseplate. Each baseplate of an LRU has a straight edge parallel to the array direction of the modules. In a preferred embodiment, the modules are located adjacent the straight edge without significant intermediary components. The LRUs are arrayed with their straight edges aligned in a plane. The straight edges are coupled to a generally planar cold plate for extracting heat from the baseplates. Since the heat is extracted in a direction orthogonal to the arraying direction of the modules, all the modules tend to have the same operating temperature. In a particularly advantageous embodiment, the circulators associated with each TR module are mounted on the opposite side of the cold plate relative to the module, to thereby minimize the thermal path length between each module and the cold plate.

Improved or alternative active antenna array structures are desired.

SUMMARY OF THE INVENTION

An array antenna according to an aspect of the invention comprises a generally planar first cold plate defining first and second broad sides, and a generally planar second cold plate defining first and second broad sides. The first broad side of the second cold plate lies generally parallel with the second broad side of the first cold plate, and spaced therefrom to define a generally planar volume. A generally planar array of antenna elements is supported on the first broad side of the first cold plate, and in thermal communication therewith. A transmit/receive arrangement is physically juxtaposed with the second side of the second cold plate and in thermal communication therewith. A beamformer arrangement is physically located in the planar volume, and electrically connected through the first cold plate with the array of antenna elements and through the second cold plate with the transmit/receive arrangement.

An array antenna according to another aspect of the invention comprises a first cold plate defining first and second broad sides. The first cold plate is generally planar and extends in first and second dimensions. A second cold plate defines first and second broad sides, and is generally planar and extends in the first and second dimensions. The first broad side of the second cold plate lies generally parallel with the second broad side of the first cold plate and spaced therefrom to define a generally planar first volume. A plurality of cold plate wall pairs is provided. Each of the wall pairs includes first and second walls, with each of the walls of each of the wall pairs being generally planar and extending in the first dimension and in a third dimension, orthogonal to the first and second directions. The first and second walls of each of the wall pairs may be spaced apart to thereby define at least one generally planar second volume extending generally in the first and third dimensions. An edge of each of the first and second walls is affixed to the second broad side of the second cold plate at spaced-apart locations, to thereby define a plurality of third volumes lying between mutually adjacent walls of adjacent ones of the wall pairs. Each of the third volumes is generally three-dimensional, with the largest dimension of each of the third volumes extending parallel with the first dimension, and with each of the third volumes extending in the third dimension by the same distance from the second broad side of the second cold plate. The array antenna further includes a generally planar array of antenna elements supported on the first broad side of the first cold plate, and in thermal communication therewith. A controllable transmit/receive arrangement is physically juxtaposed with the second side of the second cold plate within each of the third volumes. The transmit/receive arrangement is in thermal communication with the second side of the second cold plate. A beamformer arrangement is physically located in the first volume, and electrically connected through the first cold plate with the array of antenna elements and through the second cold plate with the transmit/receive arrangement, for transmitting and receiving electromagnetic signals by way of the antenna elements and the controllable transmit/receive arrangement. In one embodiment, a control or processor module is located in each of the second volumes, and communicates with the transmit/receive arrangement, for controlling the transmission and reception of the electromagnetic signals. The control module is in thermal communication with the first and second walls of the wall pair defining its associated second volume. In a particular embodiment of this aspect of the invention, each transmit/receive arrangement has an extent in the third dimension smaller than the distance, so that a portion of the third volume is not filled by the transmit/receive arrangement, and the array antenna further comprises at least a power supply for the transmit/receive arrangement located in the portion of the third volume. In an alternative embodiment, each transmit/receive arrangement has an extent in the third dimension smaller than the distance, so that a portion of the third volume is not filled by the transmit/receive arrangement, and the array antenna further comprises at least a power supply located in the portion of the third volume, where the power supply is for the transmit/receive arrangement and for an adjacent control module.

A subarray of an array antenna according to another aspect of the invention comprises a first cold plate defining first and second broad sides. The first cold plate is generally planar and extends generally in first and second dimensions. A second cold plate defines first and second broad sides. The second cold plate is generally planar and extends in the first and. second dimensions. The first broad side of the second cold plate lies generally parallel with the second broad side of the first cold plate, and is spaced therefrom to define a generally planar first volume. The subarray further comprises a plurality of cold plate wall pairs, each of which wall pairs includes first and second walls. Each of the walls of each of the wall pairs is generally planar and extending in the first dimension and in a third dimension, orthogonal to the first and second dimensions. The first and second walls of each of the wall pairs are spaced apart to thereby define a generally planar second volume extending in the first and third dimensions. An edge of each of the first and second walls is affixed to the second broad side of the second cold plate at spaced-apart locations so that each of the wall pairs extends generally perpendicular to the second broad side of the second cold plate, and to thereby define a plurality of elongated third volumes lying between mutually adjacent walls of adjacent ones of the wall pairs. The direction of elongation of each of the third volumes extends parallel with the first dimension, and each of the third volumes extends in the third dimension by a selected distance from the second broad side of the second cold plate. A generally planar array of antenna elements is supported on the first broad side of the first cold plate, and this array is in thermal communication with the first cold plate. At least one controllable transmit/receive arrangement is physically juxtaposed with the second side of the second cold plate within each of the third volumes, and is in thermal communication with the second cold plate. The dimension of the transmit/receive arrangement in the third dimension is less than the selected dimension, so that a rear portion of the third volume lying adjacent the transmit/receive arrangement is not occupied. A beamformer arrangement is physically located in the first volume, and electrically connected through the first cold plate with the array of antenna elements and through the second cold plate with the transmit/receive arrangement, for transmitting and receiving electromagnetic signals by way of the antenna elements and the controllable transmit/receive arrangement. A control module is located in the second volume or in each of the second volumes, and communicates or communicate with the transmit/receive arrangement, for controlling the transmission and reception of the electromagnetic signals. The control module is in thermal communication with the first and second walls of the wall pair defining its associated first volume. A power supply for at least the transmit/receive arrangement lies in the rear portion of the third volume.

DESCRIPTION OF THE INVENTION

Thermal management or heat removal from the various active modules of the system is provided by transfer of the heat from the modules to the various cold plates. More particularly, it has been discovered that in high power systems, the radiating elements of the antenna array 214 of can "dissipate" (produce) significant heat, which, in conjunction with the heat produced by the transmit-receive elements, may be more than can be conveniently carried away by a single cold plate. For this reason, a set of two mutually parallel cold plates is used, one to sink heat from the radiating elements, and one to sink heat from the TR modules and the remaining LRUs. The beamformer does not generally produce a great deal of heat, but is placed between the two planar cold plates due for convenience and electrical requirements.

Figure 1:
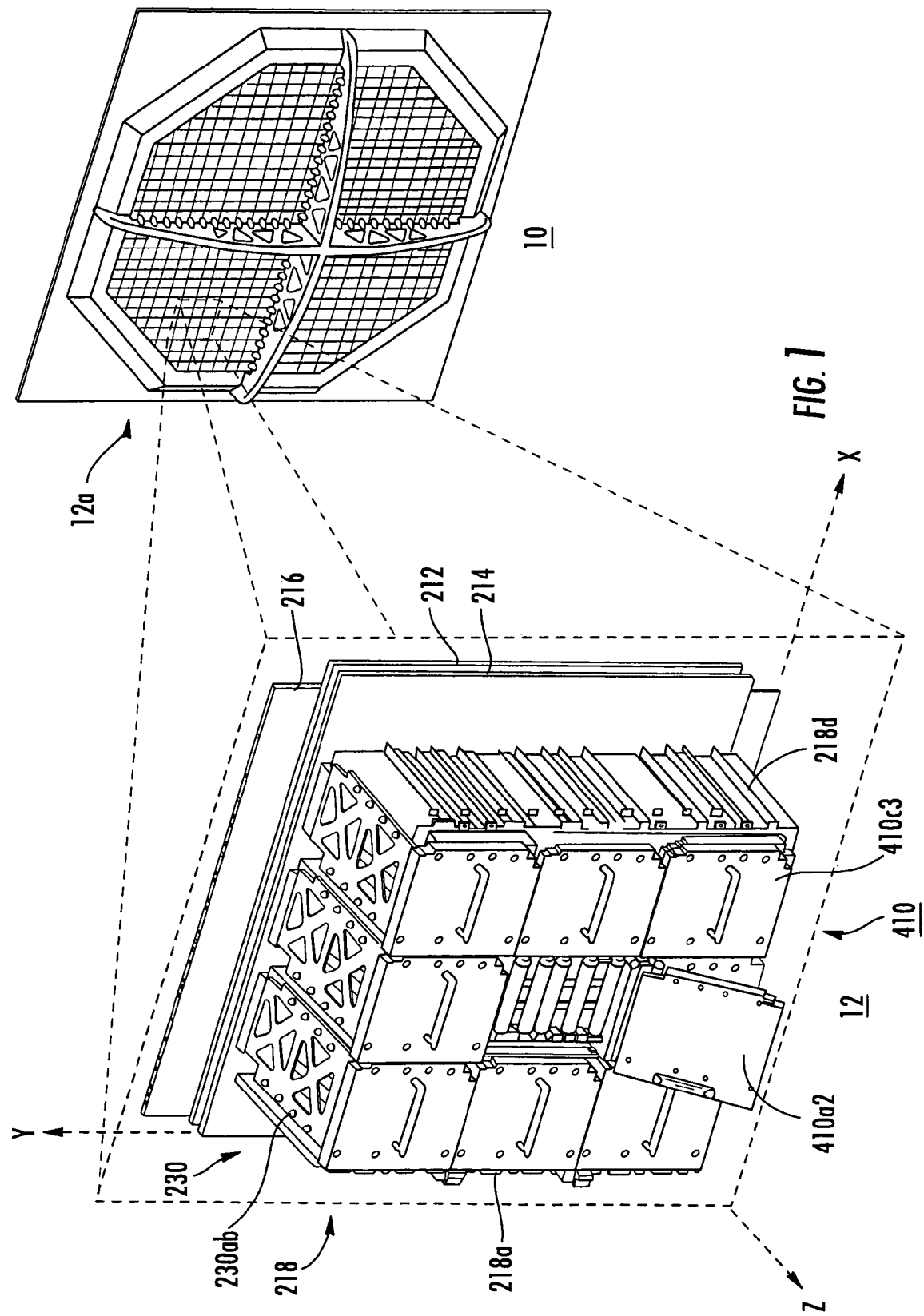
FIG. 1 is a simplified perspective or isometric view of the rear of an octagonal array antenna illustrating an array of antenna electronic element support structures populated with electronic elements, and also illustrates a single one of the populated antenna electronic element support structures broken away from the antenna.
Figure 2:
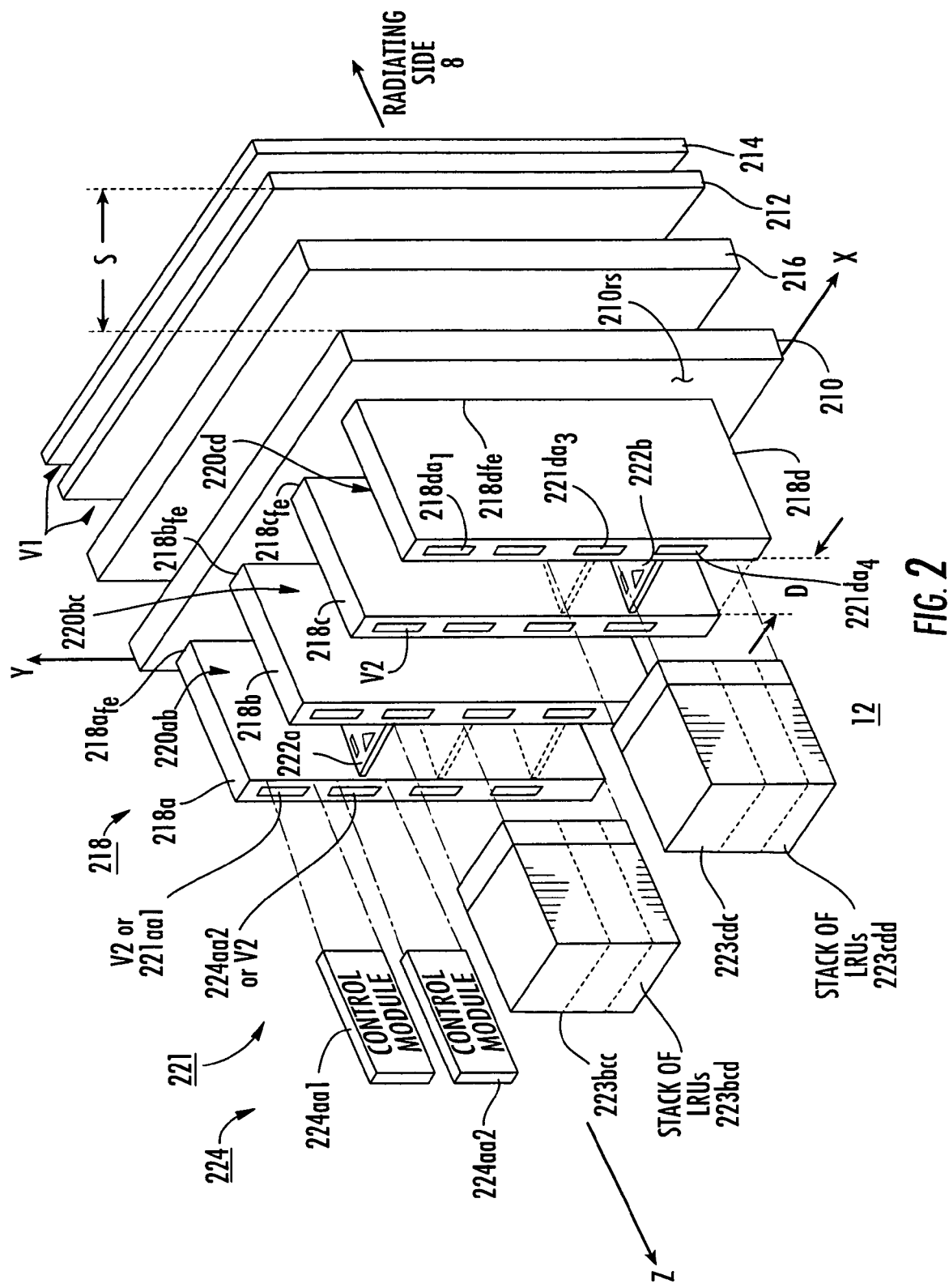
FIG. 2 is a simplified exploded view of a portion of the single support structure of FIG. 1.

FIG. 1 is a simplified perspective or isometric view of the rear of an octagonal array antenna 10 illustrating an array 12a of antenna electronic element support structures populated with electronic elements. The radiating face of antenna 10 of FIG. 1 is the side opposite to the illustrated side. FIG. 1 also illustrates a portion of the populated antenna electronic element support structure, which is broken away from antenna 10 and is illustrated as 12. Populated support structure 12 of FIG. 1 is thus a portion of, or a subset of a plurality of similar populated support structures which together make up a portion of antenna array 10. In FIG. 1, the rear portion of the populated support structure 12 is closed by a set 410 including a plurality of door-like plates or DREX modules, two of which are designated 410a2 and 410c3, with the suffixes related to the row and column with which the DREX module is associated. FIG. 2 is a simplified exploded view of a portion of the structure of FIG. 1.

In FIG. 2, a generally planar, preferably liquid-cooled "TR" (transmit-receive) cold plate 210 extends in the x and y planes of a coordinate system. A second generally planar, preferably liquid-cooled "radiator" cold plate 212 lies parallel with cold plate 210. Cold plate 212 has an array of elemental antenna elements, illustrated as a generally planar structure 214, mounted on the radiating side thereof. Cold plate 212 is spaced apart from cold plate 210 by a separation distance S which defines a volume V1, and the intervening space or volume V1 is occupied by a beamformer arrangement illustrated as a block 216.

Figure 5A:
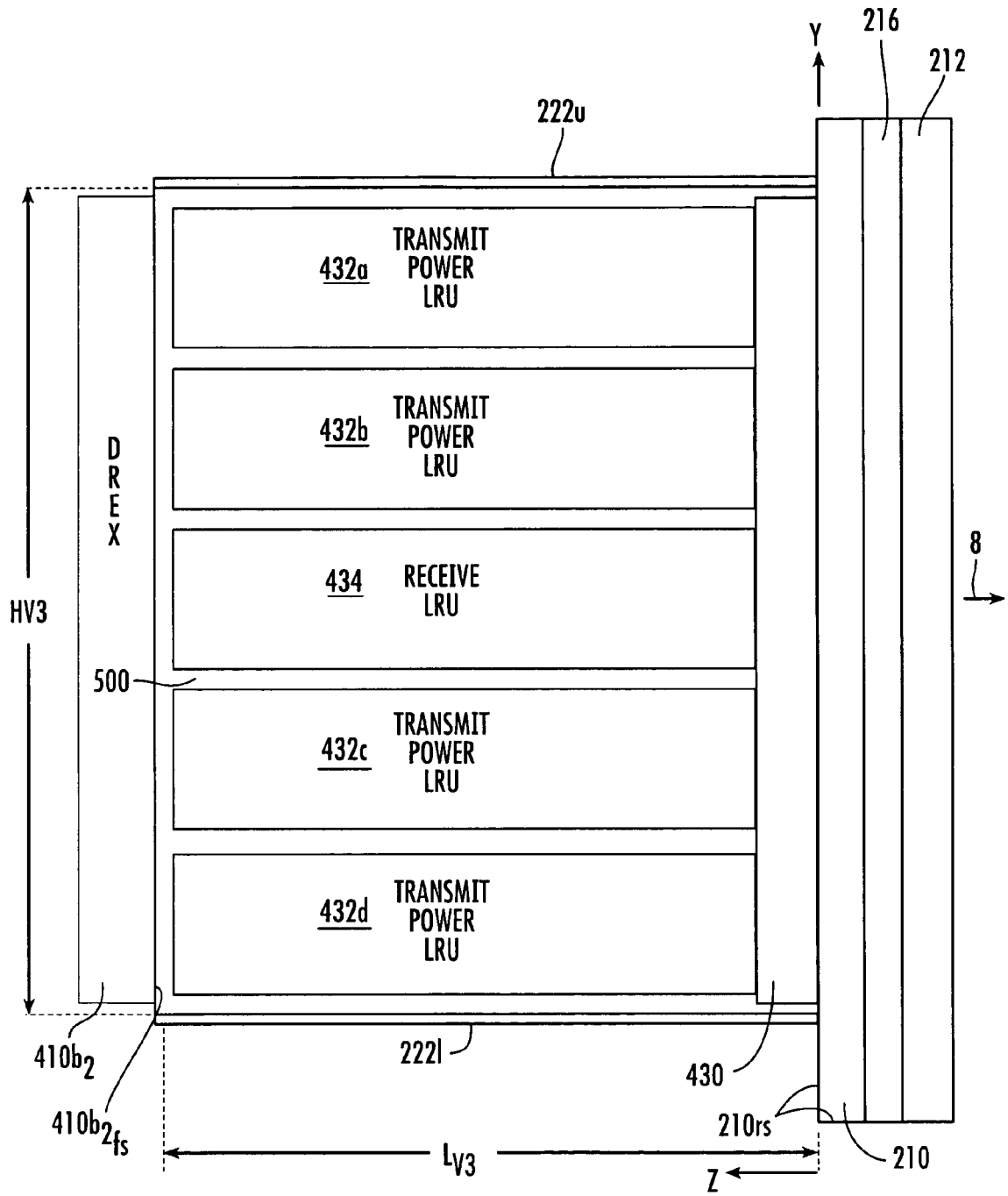
FIG. 5a is a simplified side cross-sectional elevation view of a portion of a bay of the arrangement of FIG. 4a or 4b, populated with some line-replaceable units (LRUs)

In FIG. 2, an array or set 218 of four column supports or cold plates 218a, 218b, 218c, and 218d are mechanically and thermally affixed at edges $218a_{fe}$, $218b_{fe}$, $218c_{fe}$, and $218d_{fe}$ to the "rear" side 210rs of TR cold plate 210, and are illustrated as generally planar blocks extending in mutually parallel yz planes, spaced apart in the x direction by a distance D. The spacing of the four column cold plates from each other by distance D defines a set 220 of three "vertically" oriented bays which provide space or volume defining vertically oriented bays. The vertically oriented bays of set 220 are designated 220ab, 220bc, and 220cd, but each may be viewed as being a third volume V3. The vertically oriented bays are for the fitting of stacks of Line Replaceable Units (LRUs) between the column cold plates of array 218, in thermal communication or contact with the column cold plates. Each of these bays may be viewed as being a third volume V3 defined by the space lying between rear surface 210rs of TR coldplate 210, the column supports or cold plates, and the coplanar rear edges of the column cold plates. The length LV3 of each of these bays in the z direction is illustrated in FIG. 5a. It should be noted that, while FIG. 2 illustrates array 218 as including four column cold plates, it may include any number greater than three.

The description herein includes relative placement or orientation words such as "top," "bottom," "up," "down," "lower," "upper," "horizontal," "vertical," "above," "below," as well as derivative terms such as "horizontally," "downwardly," and the like. These and other terms should be understood as to refer to the orientation or position then being described, or illustrated in the drawing(s), and not to the orientation or position of the actual element(s) being described or illustrated. These terms are used for convenience in description and understanding, and do not require that the apparatus be constructed or operated in the described position or orientation. Also, terms concerning mechanical attachments, couplings, and the like, such as "connected," "attached," "mounted," refer to relationships in which structures are secured or attached to one another either directly or indirectly through intervening structures, as well as both movable and rigid attachments or relationships, unless expressly described otherwise.

FIG. 2 illustrates a set 223 of stacks of Line Replaceable Units (LRUs). In FIG. 2, stacks of LRUs are illustrated as 223bce, 223bcd, 223cdc, and 223cdd. As illustrated in the embodiment of FIG. 5a, a stack of LRUs includes five LRUs. A set 222 of a plurality of shear plates, two of which are illustrated in FIG. 2 as 222a and 222b, extend between adjacent ones of the column supports or cold plates of set 218 of column supports or cold plates. The shear plates lie parallel with the xz plane, and are spaced vertically so as to lie between mutually adjacent stacks of LRUs. For example, shear plate 222b is positioned in the y direction so as to lie between stacks of LRUs 223cdc and 223cdd. As also illustrated in FIG. 2, the column supports or cold plates 218a, 218b, 218c, and 218d of array or set 218 of column supports or cold plates each defines a set 221 of apertures including a plurality of apertures extending into the interior of the column supports or cold plates, some of which apertures are illustrated as 221aa1, 221aa2, 221da1, 221da3, and 221da4. These apertures of set 221 are spaced apart in the y direction by the same distance as that separating the shear plates of set 222. Each aperture of set 221 is dimensioned to accommodate a control or processor module of a set 224 of control or processor modules. For example, control module 224aa1 of FIG. 2 is accommodated in aperture 221aa1, and control module 224aa2 is accommodated in aperture 221aa2. The radiator cold plate, TR cold plate, and column cold plate together provide thermal management for the electronics associated with the system, and are the primary physical support therefor. The functional aspects of the electronic modules and tiles are described in conjunction with FIG. 9.

Figure 3:
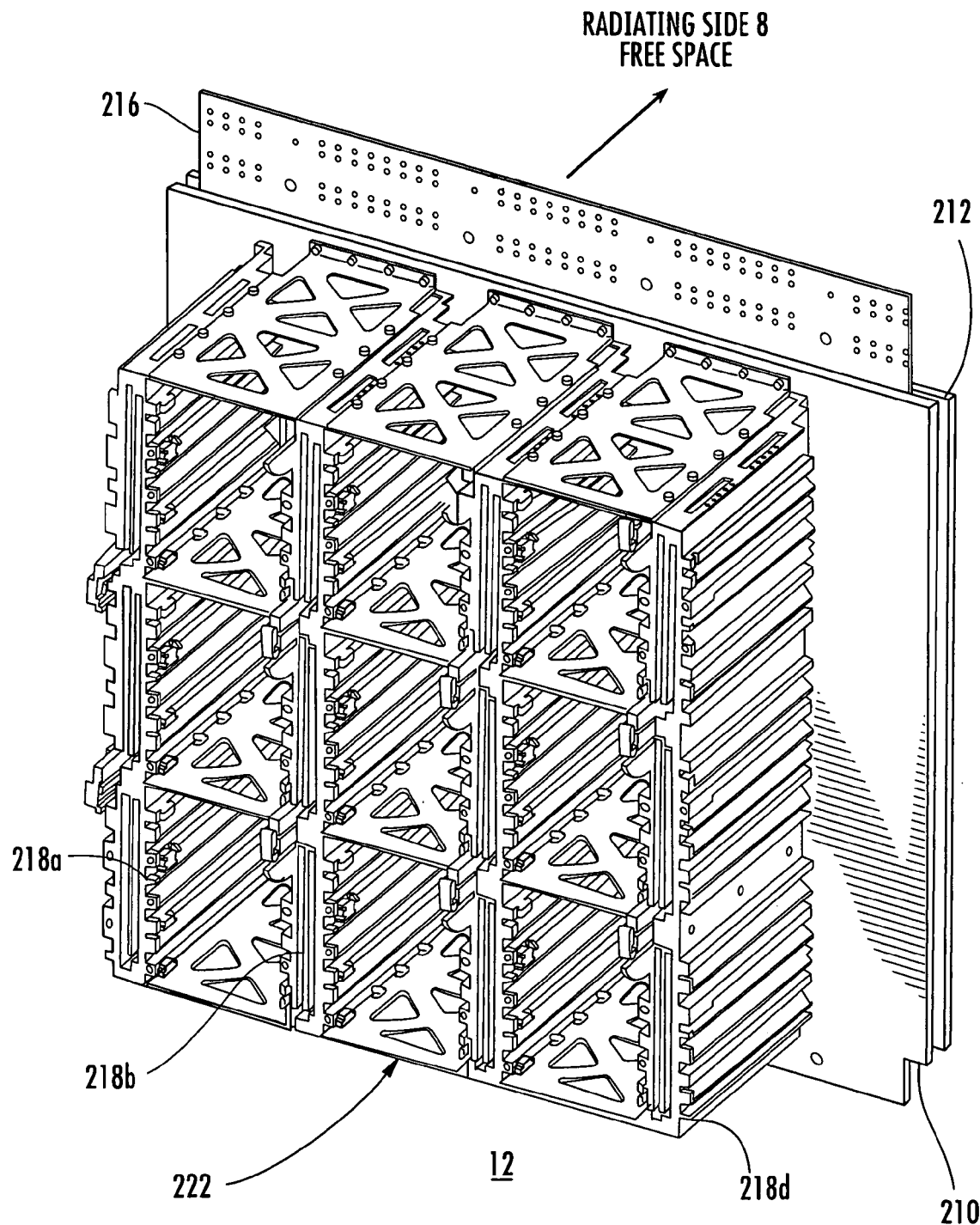
FIG. 3 is a simplified representation of a support structure of FIGS. 1 and 2 in a depopulated condition but including coldplates.

FIG. 3 is a simplified representation of the support structure of FIGS. 1 and 2 in a depopulated condition (without LRUs or modules). Elements corresponding to those of FIGS. 1 and 2 are designated by like reference alphanumerics. FIG. 3 illustrates some details of the structure of the column supports or cold plates of set 218 of column supports or cold plates. As illustrated, each side of each column support or cold plate of set 218 defines a plurality of rails on which the individual line replaceable units (LRUs) can slide during population of the support structure, and which also define surfaces which abut the LRUs to allow heat transfer from the LRUs to the column support or cold plates.

Figure 4A:
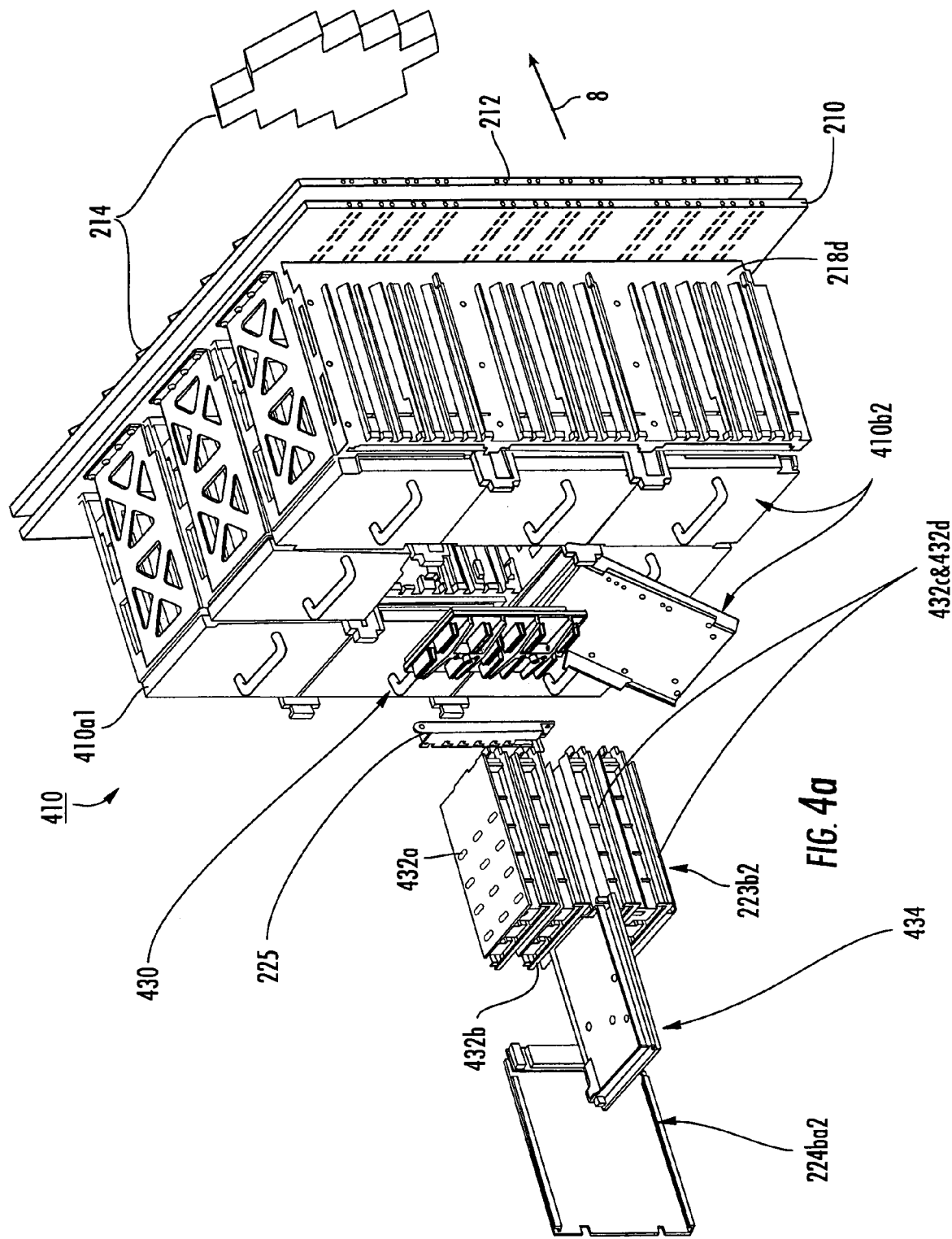
FIG. 4a is a simplified perspective or isometric rear view, partially exploded to reveal relationships, of a single support structure of FIG. 1, 2, or 3, showing some details of the LRUs which are accommodated in each section of a bay.

FIG. 4a is a simplified perspective or isometric view, partially exploded to reveal relationships, of a single support structure of FIG. 1, 2, or 3, showing some details of the LRUs which are accommodated in each section of a bay. In FIG. 4a, elements corresponding to those of FIGS. 1, 2, and 3 are designated by like reference numerals. As illustrated, each of the three vertically disposed sections of each of the three bays defined by the spaces between the column supports or cold plates is closed at the rear side (the side remote from the radiating side 8) by a hinged Digital Receiver Exciter (DREX) tile or module. Thus, the structure of FIG. 4a has a set 410 of a total of nine DREX tiles or modules, one of which, designated 410b2, is illustrated as being open, and another of which is designated 410a1.

Figure 6:
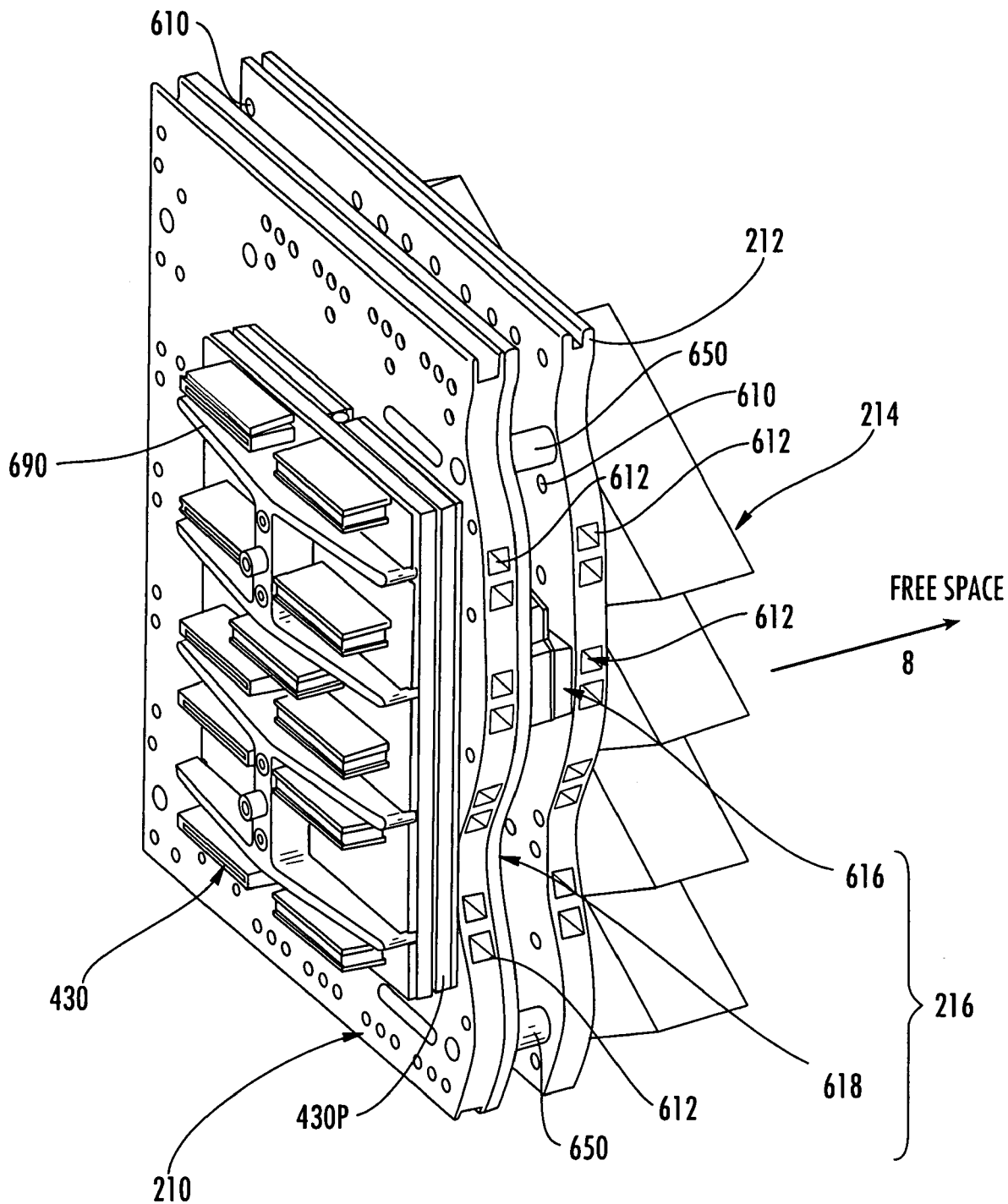
FIG. 6 is a simplified perspective or isometric view of a portion of the structure including portions of the radiator tile, radiator coldplate, beamformer, TR coldplate, and TR tile.

The open state of DREX tile 410b2 of FIG. 4a makes it possible to load or unload various LRU modules into the associated section of the middle vertical bay. The loading of the modules into an empty bay with open DREX tile is started by inserting into the open bay section a Transmit-Receive (TR) tile or module 430. The TR module fits against the rear surface of TR coldplate 210, as illustrated in FIGS. 5a and 6. The transmit power LRUs or modules of stack 223b2 are then inserted into specific positions within the open bay. As illustrated in FIG. 5a, these locations are the two uppermost locations and the two lowermost locations, leaving the center location free. The Receive power LRU 434 is then inserted into the remaining central module location in the open bay.

Figure 5B:
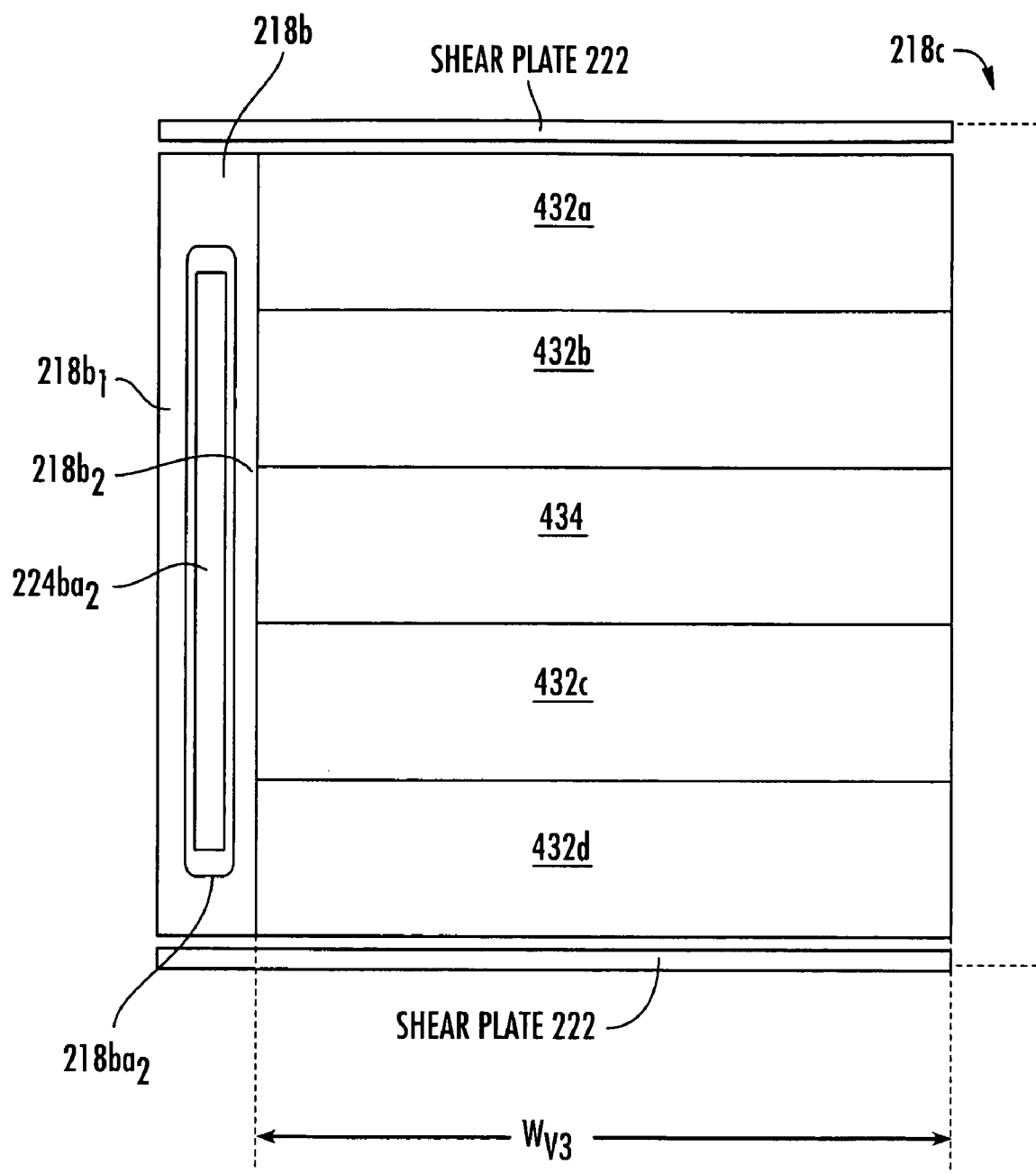
FIG. 5b is a corresponding rear side cross-sectional elevation view.

In FIG. 4a, it can be seen that the control or processor LRU or module 224ba2 lies to the side of the stacked LRUs 223b2, together with a processor backplane 225. In FIG. 5a, control or processor LRU 224ba2 lies behind the stacked power modules 432a, 432b, 432c, 432d, and 434, so it is not visible. FIG. 5b is a simplified view of the rear of the open bay fully loaded with LRUs, including control or processor LRU 224ba2. Control or processor backplane 225 is inserted into one of the apertures, namely aperture 218ba2, defined in the column support or cold plate 218b. Processor LRU 224ba2 is then inserted into the same one of the apertures to mate electrically with the backplane 225. Finally, the DREX tile is fastened to the rear of the structure.

Figure 4B:
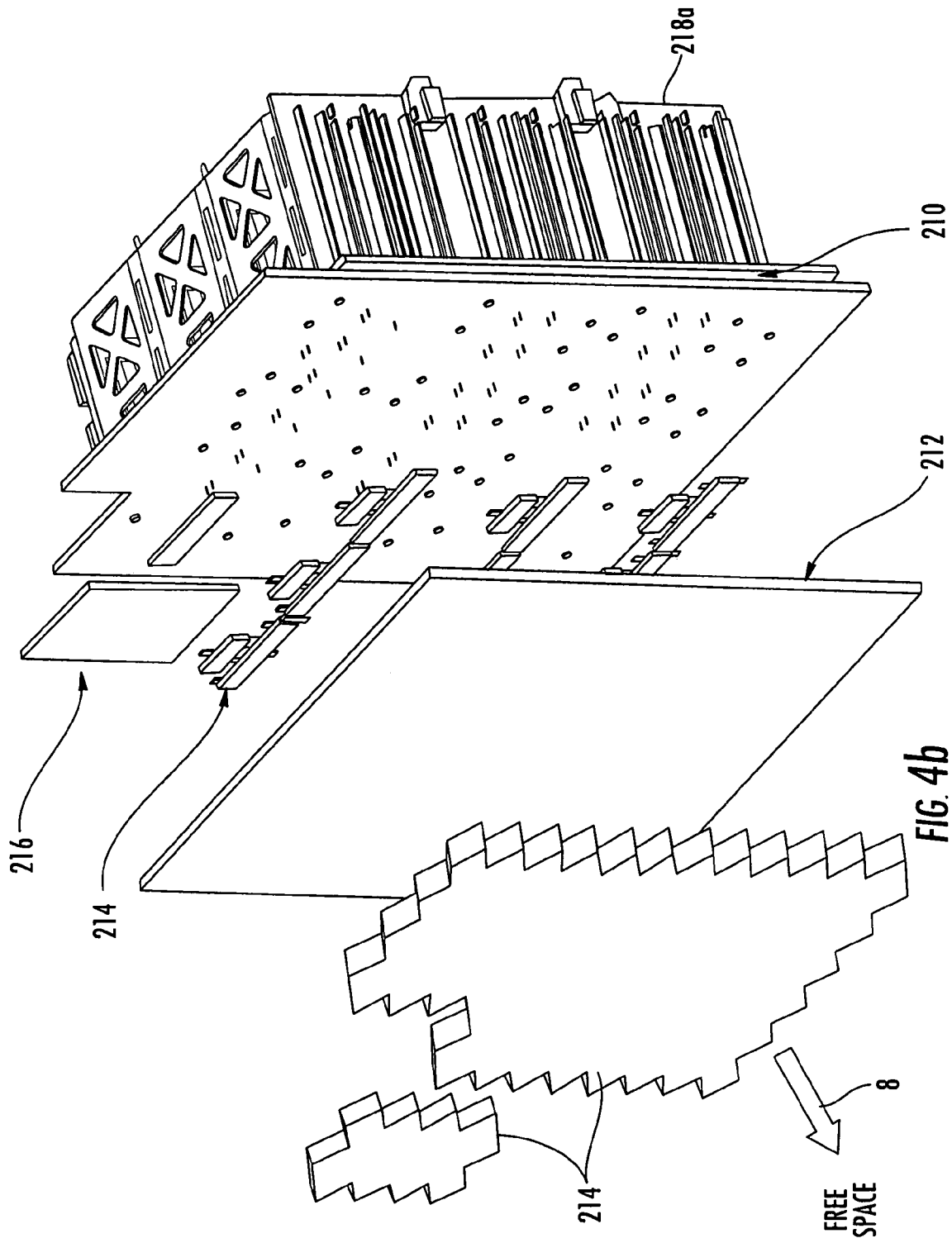
FIG. 4b is a corresponding front or radiating-side view.

FIG. 4b is a simplified, partially exploded, perspective or isometric view of the structure of FIG. 4a as seen from the front or radiating side. The individual radiator tiles of the radiator 216 are mounted on the front or radiating surface of the radiator coldplate 212.

The various modules of the populated support structure 12 as so far described are interconnected as known in the art by radio-frequency (RF) transmission lines and RF connectors, which in some cases must pass through the cold plates. Those skilled in the art know that "radio" frequencies as now understood extends over the entire electromagnetic spectrum, including those frequencies in the "microwave" and "millimeter-wave" regions, and up to light-wave frequencies. The electrical interconnections and blind-mating connectors required among the various modules are well known to those skilled in the art, and require no further discussion. One form of blind mating connectors is described in U.S. Pat. No. 6,469,471.

FIG. 5a is a simplified side elevation view, partially cut away, of a portion of the structure of FIGS. 4a and 4b, and FIG. 5b is a rear elevation view. As illustrated; a bay 500 is defined between the rear surface 210rs of the TR tile or module 210 and the front surface $410b2_{fs}$ of DREX tile 410b2, and between upper and lower shear plates 222u and 222l. The length of bay 500 in the z direction is designated $L_{V3}$, and the height is HV3. Referring to FIG. 5b, the width of the portion of the bay 500 between adjacent walls of column supports or cold plates 218b and 218c is designated $W_{V3}$. Bay 500 has a volume V3 which is the product of $Lv3 \times Wv3 \times HV3$. In FIGS. 5a and 5b, the TR tile or module 430 can be seen to lie against the rear surface 210rs of TR coldplate 210, for ready transfer of heat from the TR tile or module. The length of TR module or tile 430 in the z direction is relatively small, so the principal volume V3 is left free after insertion of TR module or tile 430. This free volume is occupied by a set of five power modules stacked one atop the other, corresponding to one of the stacks of set 223 of LRUs of FIG. 2]]. The uppermost power module of the stack of LRUs of FIG. 5a is transmit power module 432a, which lies above transmit power module 432b. The lowermost module is transmit power module 432d, which lies below transmit power module 432c. A receive power module 434 lies between transmit power modules 432b and 432c. As illustrated in FIG. 5a, the DREX tile 410b2, when in its closed position, is located to the rear of bay portion 500. DREX tile 224gba2 is thermally sunk to the rear edges of the adjacent column cold plates. TR module or tile 430 is thermally sunk to TR cold plate 210, and power modules 432a, 432b, 432c, and 432d, as well as power module 434, are thermally sunk to the adjacent column supports or cold plates of set 218, which are in turn sunk to TR cold plate 210. Referring to FIG. 5b, control or processor module 224ba2 is housed within the volume V2 of aperture 218ba2 lying between the walls 218b1 and 218b2 of wall pair 218b.

FIG. 6 is a simplified perspective or isometric view of the rear of a portion of the structure of FIGS. 4a and 4b, illustrating details of the radiator and TR coldplates, of the beamformer and of the TR module or tile. In FIG. 6, the radiator coldplate 212 and the TR coldplate 210 are seen to define a plurality of apertures extending therethrough, some of which are designated 610, to accommodate RF transmission lines and/or connectors required for making electrical interconnections among the various modules and tiles. In addition, radiator coldplate 212 and the TR coldplate 210 are seen to define a plurality of apertures extending transversely or parallel with the broad surfaces of the coldplates, some of which are designated 612, for carrying a flow of coolant. As illustrated in the detail of FIG. 6, the TR module or tile 430 consists of a thin planar structure 430P juxtaposed to the TR coldplate 210, and has a plurality of electrical connectors on its "rear" surface to provide an electrical interface to the power LRUs. Similarly, at the level of detail of FIG. 6, the beamformer 216 is not totally planar, but includes a generally planar circuit board 618 and beamformer modules 616 mounted thereon. Radiator coldplate 212 is supported relative to TR coldplate 210, at least in part, by a set of support elements, such as 650, extending therebetween.

Figure 7:
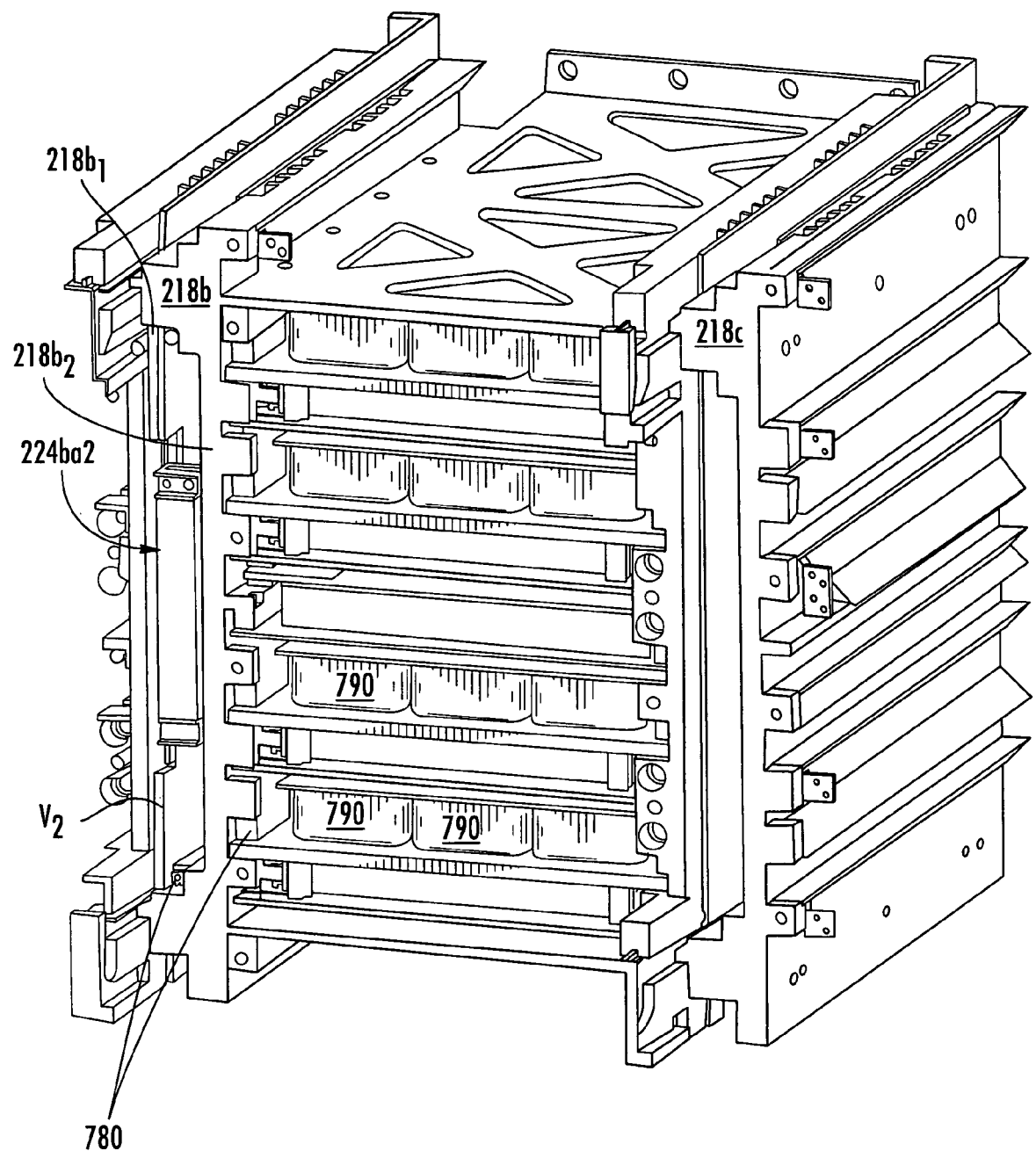
FIG. 7 is a simplified perspective or isometric rear view of a portion of a populated portion of a bay with internal modules or tiles exposed by removal of DREX tile.

FIG. 7 is a simplified perspective or isometric rear view of a portion of a populated portion of a bay with internal modules or tiles exposed by removal of DREX tiles, showing some of the thermal coupling surfaces.

Figure 8:
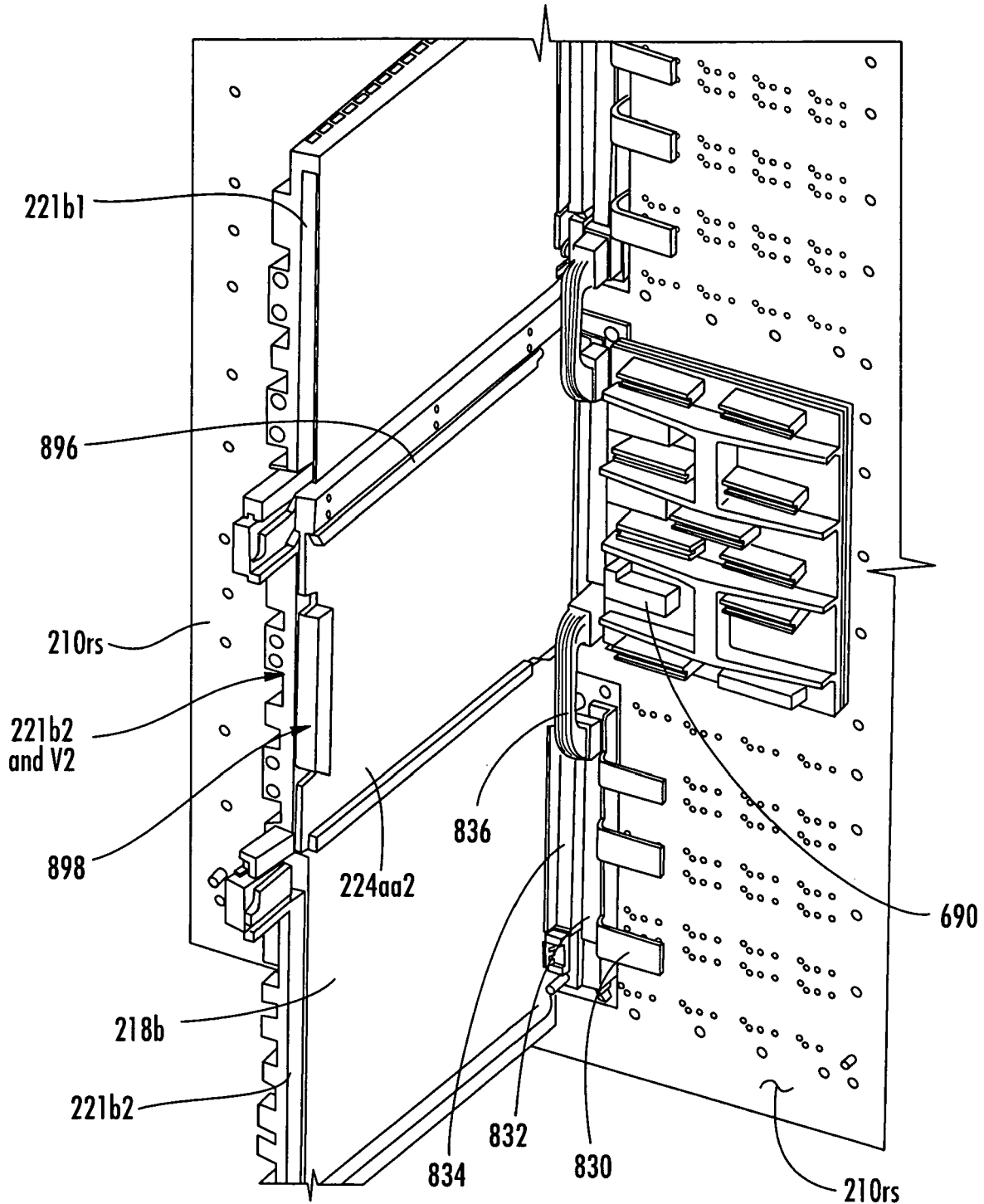
FIG. 8 is a partially exploded and cut away rear view of a portion of a bay of a mostly depopulated support structure without shear plates, illustrating some details of the electrical connections.

FIG. 8 is a partially exploded and cut away rear view of a portion of a bay of a mostly depopulated support structure without shear plates, illustrating some details of the electrical connections. FIG. 8 illustrates the rear surface 210$rs$ of the TR coldplate 210, together with a column wall or cold plate 218$b$. The vertically-disposed apertures 221$b1$ and 221$b3$ defined in the rearmost faces of column wall or cold plate 218$b$ are visible in FIG. 8, and a portion of aperture 221$b2$ also appears. A portion of the column wall or cold plate 218$b$ is cut away at a location lying adjacent aperture 221$b2$, to illustrate the internal volume V2 occupied by a control or processor module 224$aa2$. Adjacent the rearmost surface of processor module 224$aa2$ lies a processor-to-DREX interface connector 898. A processor-to-backplane interface connection arrangement is illustrated as 896. Element 836 represents some of the inter-module electrical wiring and connections. Element 832 represents a connector bus for interconnecting power LRU connectors 830 with their respective loads.

The column supports or cold plates of set 218 are ultimately heat-sunk to the TR planar cold plate 210. The column supports or cold plates of set 218 provide thermal control for the transmit and receive power LRUs, the processor LRU and the DREX tile. It will be appreciated that the chassis of the power-handling LRUs are fabricated from high-thermal-conductivity materials, so that the heat generated thereon can readily be coupled therethrough to the column coldplates. The various coldplates are likewise fabricated from high-thermal-conductivity materials to facilitate thermal coupling among the coldplates and to any coolant flowing in the coldplates.

Those skilled in the arts of antenna arrays and beamformers know that antennas are transducers which transduce electromagnetic energy between unguided- and guided-wave forms. More particularly, the unguided form of electromagnetic energy is that propagating in "free space," while guided electromagnetic energy follows a defined path established by a "transmission line" of some sort. Transmission lines include coaxial cables, rectangular and circular conductive waveguides, dielectric paths, and the like. Antennas are totally reciprocal devices, which have the same beam characteristics in both transmission and reception modes. For historic reasons, the guided-wave port of an antenna is termed a "feed" port, regardless of whether the antenna operates in transmission or reception. The beam characteristics of an antenna are established, in part, by the size of the radiating portions of the antenna relative to the wavelength. Small antennas make for broad or nondirective beams, and large antennas make for small, narrow or directive beams. When more directivity (narrower beamwidth) is desired than can be achieved from a single antenna, several antennas may be grouped together into an "array" and fed together in a phase-controlled manner, to generate the beam characteristics of an antenna larger than that of any single antenna element. The structures which control the apportionment of power to (or from) the antenna elements are termed "beamformers," and a beamformer includes a beam port and a plurality of element ports. In a transmit mode, the signal to be transmitted is applied to the beam port and is distributed by the beamformer to the various element ports. In the receive mode, the unguided electromagnetic signals received by the antenna elements and coupled in guided form to the element ports are combined to produce a beam signal at the beam port of the beamformer. A salient advantage of sophisticated beamformers is that they may include a plurality of beam ports, each of which distributes the electromagnetic energy in such a fashion that different beams may be generated simultaneously.

Figure 9:
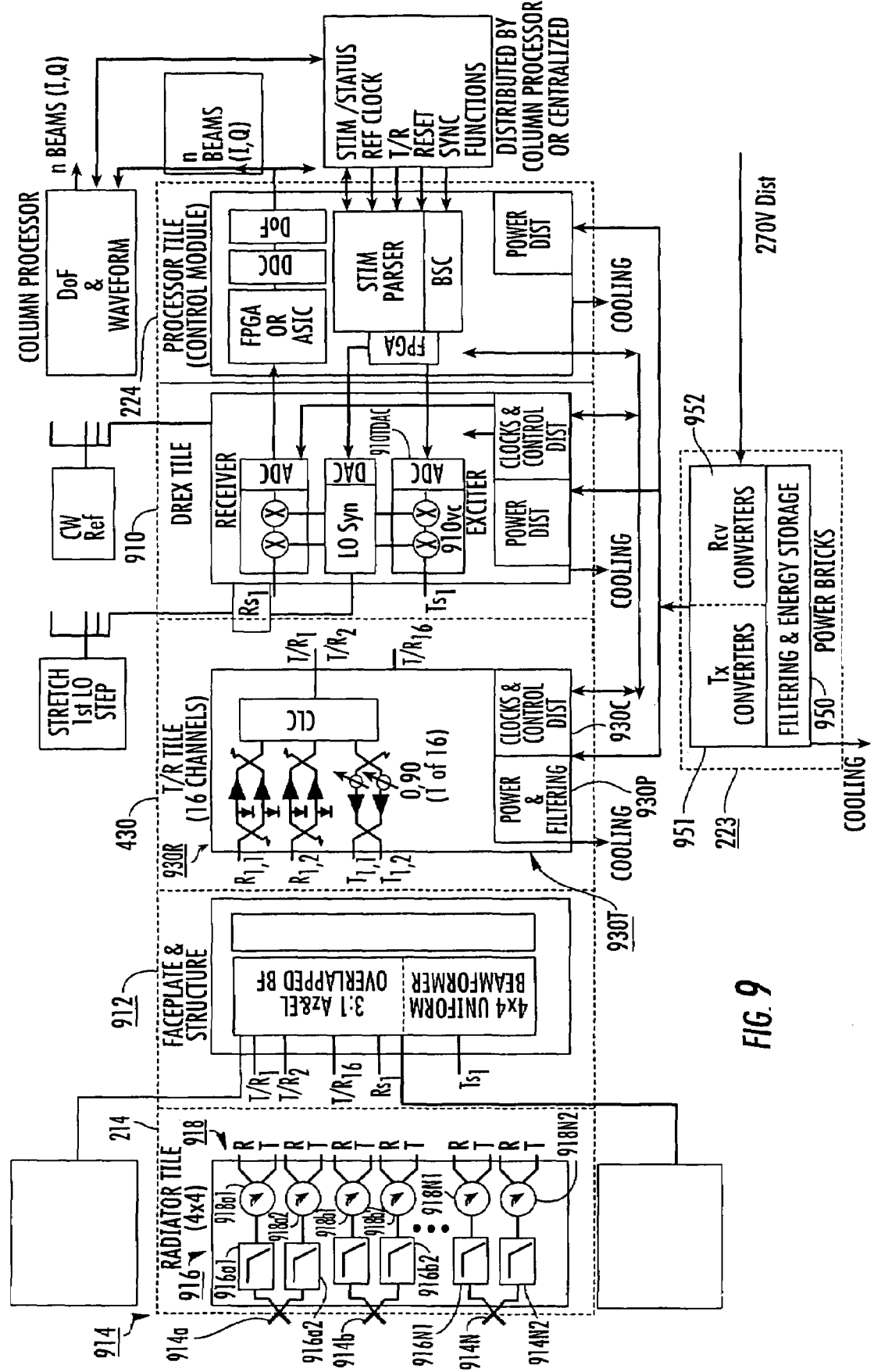
FIG. 9 is a simplified functional block diagram of a radar system which uses the various tiles and elements according to an aspect of the invention.

FIG. 9 illustrates how the various modules and tiles as described coact to function as a radar system. It should be understood that the structure illustrated in FIG. 9 represents only a small portion of a complete radar system. The radar system is made up of many interoperating modules and tiles. In FIG. 9, the radiator tile 214 is indicated as having a 4×4 configuration, meaning that a set 914 of sixteen dual-polarization radiators 914$a$, 914$b$, . . . , 914N are available. Each single-polarization radiator of set 914 is associated with a corresponding low-pass filter. Thus, dual-polarization radiator 914$a$ is associated with two low-pass filters of set 916, namely 916$a1$ and 916$a2$. Similarly, dual-polarization radiator 914$b$ is associated with low-pass filters 916$a$ and 916$b$, and dual-polarization radiator 914N is associated with low-pass filters 916N1 and 916N2. Each low-pass filter of set 916 of low-pass filters is coupled to a port of a three-way circulator of a set 918 of circulators, for receiving transmit signals flowing from the circulators to the radiators and for coupling received signals from the radiators to the circulators. Thus, a transmit/receive port of circulator 918$a1$ is coupled to low-pass filter 916$a1$, a transmit/receive port of circulator 918$a2$ is coupled to a port of low-pass filter 918$a2$, a transmit/receive port of circulator 918$b1$ is coupled to low-pass filter 916$b1$, a transmit/receive port of circulator 918$b2$ is coupled to a port of low-pass filter 918$b2$, . . . , and a transmit/receive port of circulator 918N1 is coupled to low-pass filter 916N1, and a transmit/receive port of circulator 918N2 is coupled to a port of low-pass filter 918N2. Each circulator of set 918 of circulators also has a receive (R) port and a transmit (T) port. As described above, the radiator tile 214 is supported by and thermally sunk to the radiator coldplate 212 (not illustrated in FIG. 9).

In FIG. 9, the Faceplate and Structure block represents the beamformer, designated 912 as well as the T/R coldplate (not illustrated in FIG. 9). The beamformer 912 accepts signals to be transmitted and routes them to the appropriate element of the radiator tile, and combines the received signals from the radiator tile, all in known fashion. The electrical connections between the beamformer 912 of FIG. 9 must extend through the radiator coldplate 212. The beamformer is thermally sunk to at least a side of the T/R coldplate 210 of FIG. 1.

The T/R tile 420 of FIG. 9 includes a set 930R of sixteen of receiving or low-noise amplifiers, the input ports of which are coupled through the T/R coldplate 210 (FIG. 2) to the various electrical ports of the beamformers of faceplate and structure 912 of FIG. 9. The T/R tile 420 of FIG. 9 also includes a set 930T of sixteen transmit or power amplifiers, the output ports of which are also coupled through the T/R coldplate (not illustrated in FIG. 9) to the beamformers of block 912. The control logic circuit (CLC) acts under the control of the Processor tile to route the various signals to and from the receivers and exciters of the DREX tile 910. The T/R tile 420 also includes local power and clock functions designated 930$p$ and 930$c$, respectively.

The main power conversion for supplying the transmit amplifiers 930T of T/R Tile 430 of FIG. 9 is provided by the associated transmit (Tx) power converters illustrated as a block 951, and similarly main power conversion for supplying the receive amplifiers 930R of T/R Tile 430 of FIG. 9 is provided by the associated receive (Rx) power converters illustrated as a block 952. The filtering and energy storage illustrated as a block 950 is common to both transmit and receive converters. As noted elsewhere herein in conjunction with FIG. 5*a*, the LRU stacks 223 include five LRUs, four of which are used for supplying transmit amplifier power, and one of which is used to supply receive amplifier power.

The DREX tile 910 of FIG. 9 includes a digital-to-analog converter (DAC) 910TDAC which converts digital signals representing the transmit frequency into analog signals. An upconverter illustrated as a pair of multipliers (X) is coupled to receive the analog signals and to convert them to the desired transmit frequency, which is used by the T/R tile for producing the signals to be transmitted. DREX tile 910 also includes a local oscillator synthesizer (LO SYN) which generates a local oscillator signal at a frequency related to the transmit frequency. This local oscillator frequency is applied to a downconverter illustrated as two multipliers (X) which produce intermediate-frequency (IF) or baseband analog signal from the received RF. The IF or baseband analog signal is applied to a receiver analog-to-digital converter (ADC) for converting the received signals into digital form. DREX Tile block 910 of FIG. 9 also includes local power distribution (Dist) and clock processing and distribution, illustrated by a labeled Clocks & Control Dist.

It should be understood that the block diagram of FIG. 9 is intended only to be representative of how the various physical structures according to the invention can be used. Those skilled in the art will recognize that electrical elements or subassemblies located in a particular LRU can often be moved to the LRU which is electrically adjacent, especially if the electrical elements or subassemblies have little power dissipation when in operation, so that the relative thermal loading which they occasion is not significant.

While support structures including sets 218 of four column supports or cold plates have been described, those skilled in the art will understand that any number of column supports or cold plates can be used in each support structure 12, to thereby define as many "vertically" oriented bays as may be desired. Similarly, while each separate support structure of array 12*a* has been described as providing three vertically disposed sections in each vertical bay for accommodation of Line Replaceable Units, more or fewer sections may be provided.

An array antenna 10 according to an aspect of the invention comprises a generally planar first cold plate (212) defining first (radiating) and second (rear) broad sides, and a generally planar second cold plate (210) defining first and second (210*rs*) broad sides. The first broad side of the second cold plate (210) lies generally parallel with the second broad side of the first cold plate (212), and spaced therefrom to define a generally planar volume (V1 defined by distance S). A generally planar array of antenna elements (214) is supported on the first broad (radiating) side of the first cold plate (212), and in thermal communication therewith. A transmit/receive arrangement (430) is physically juxtaposed with the second side (210*rs*) of the second cold plate (210) and in thermal communication therewith. A beamformer arrangement (216) is physically located in the planar volume (V1), and electrically connected through the first cold plate (212) with the array of antenna elements (214) and through the second cold plate (210) with the transmit/receive arrangement (430).

An array antenna (10) according to another aspect of the invention comprises a first cold plate (212) defining first (radiating) and second broad sides. The first cold plate (212) is generally planar and extends in first (y) and second (x) dimensions. A second cold plate (210) defines first and second (210*rs*) broad sides, and is generally planar and extends in the first (y) and second (x) dimensions. The first broad side of the second cold plate (210) lies generally parallel with the second broad side of the first cold plate (212) and is spaced therefrom to define a generally planar first volume (V1). A plurality of cold plate wall pairs (218*a*, 218*b*, . . . ) is provided. Each of the wall pairs (218*a*, 218*b*, . . . ) includes first (218*b*1) and second (218*b*2) walls, with each of the walls (218*b*1, 218*b*2 for example) of each of the wall pairs (218*a*, 218*b*, . . . ) being generally planar and extending in the first dimension (y) and in a third dimension (z), orthogonal to the first (y) and second (x) directions. The first (218*b*1) and second (218*b*2) walls of each of the wall pairs (218*a*, 218*b*, . . . ) are spaced apart to thereby define at least one generally planar second volume (218*ba*2, for example) extending generally in the first (y) and third (z) dimensions. An edge (218*afe*, 218*bfe*, . . . ) of each of the first (218*b*1) and second (218*b*2) walls is affixed to the second broad side (210*rs*) of the second cold plate (210) at spaced-apart locations, to thereby define a plurality of third volumes (220*ab*, 220*bc*, 220*cd*) lying between mutually adjacent walls of adjacent ones of the wall pairs (218*a*, 218*b*, . . . ). Each of the third volumes (220*ab*, 220*bc*, 220*cd*) is generally three-dimensional, with the largest dimension of each of the third volumes (220*ab*, 220*bc*, 220*cd*) extending parallel with the first dimension (y), and with each of the third volumes (220*ab*, 220*bc*, 220*cd*) extending in the third dimension (z) by the same distance from the second broad side (210*rs*) of the second cold plate (210). The array antenna (10) further includes a generally planar array of antenna elements (214) supported on the first (radiating) broad side of the first cold plate (212), and in thermal communication therewith. A controllable transmit/receive arrangement (430) is physically juxtaposed with the second side (210*rs*) of the second cold plate (210) within each of the third volumes (220*ab*, 220*bc*, 220*cd*). The transmit/receive arrangement (430) is in thermal communication with the second side (210*rs*) of the second cold plate (210). A beamformer arrangement (216) is physically located in the first volume (V1), and electrically connected through the first cold plate (212) with the array of antenna elements and through the second cold plate (210) with the transmit/receive arrangement (430), for transmitting and receiving electromagnetic signals by way of the antenna elements and the controllable transmit/receive arrangement (430). A control module (module of set 224) is located in each of the second volumes (V2 or 218*ba*2), and communicates with the transmit/receive arrangement (430), for controlling the transmission and reception of the electromagnetic signals. The control module is in thermal communication with the first (218*b*1) and second (218*b*2) walls of the wall pair (218*b*) defining its associated second volume (V2 or 218*ba*2). In a particular embodiment of this aspect of the invention, each transmit/receive arrangement (430) has an extent or size in the third (z) dimension smaller than the distance (length of V3), so that a portion of the third volume (V3) is not filled by the transmit/receive arrangement (430), and the array antenna 10 further comprises at least a power supply for the transmit/receive arrangement (430) located in the portion of the third volume. In an alternative embodiment, each transmit/receive arrangement (430) has an extent in the third dimension smaller than the distance, so that a portion of the third volume is not filled by the transmit/receive arrangement (430), and the array-antenna 10 further comprises at least a power supply located in the portion of the third volume, where the power supply is for the transmit/receive arrangement (430) and for an adjacent control module.

A subarray of an array antenna 10 according to another aspect of the invention comprises a first cold plate (212) defining first (radiating) and second broad sides. The first cold plate (212) is generally planar and extends generally in first (y) and second (x) dimensions. A second cold plate (210) defines first and second (210rs) broad sides. The second cold plate (210) is generally planar and extends in the first (y) and second (X) dimensions. The first broad side of the second cold plate (210) lies generally parallel with the second broad side of the first cold plate (212), and is spaced therefrom to define a generally planar first volume (V1). The subarray (12) further comprises a plurality (set 218) of cold plate wall pairs (218a, 218b, . . . ), each of which wall pairs (218a, 218b, . . . ) includes first (218b1, for example) and second (218b2, for example) walls. Each of the walls (218b1, 218b2) of each of the wall pairs (218a, 218b, . . . ) is generally planar and extends in the first (y) dimension and in a third (z) dimension, orthogonal to the first (y) and second (x) dimensions. The first (218b1) and second (218b2) walls of each of the wall pairs (218a, 218b, . . . ) are spaced apart to thereby define a generally planar second volume ((V2 or 221aa1, for example) extending in the first (y) and third (z) dimensions. An edge (218a$_{fe}$, 218b$_{fe}$, 218c$_{fe}$, 218d$_{fe}$) of each of the first and second walls of each of the wall pairs (218a, 218b, . . . ) is affixed to the second broad side (210rs) of the second cold plate (210) at spaced-apart locations so that each of the wall pairs (218a, 218b, . . . ) extends generally perpendicular to the second broad side (210rs) of the second cold plate (210), and to thereby define a plurality of elongated third volumes (V3 or 220ab; 220bc; 220cd) lying between mutually adjacent walls of adjacent ones of the wall pairs (218a, 218b, . . . ). The direction of elongation of each of the third volumes (V3) or bays extends parallel with the first (y) dimension, and each of the third volumes (V3) extends in the third (z) dimension by a selected distance (length of V3) from the second broad side (210rs) of the second cold plate (210). A generally planar array of antenna elements (214) is supported on the first broad (radiating) side of the first cold plate (212), and this array is in thermal communication with the first cold plate (212). At least one controllable transmit/receive arrangement (430) is physically juxtaposed with the second side of the second cold plate (210) within each of the third volumes, and is in thermal communication with the second cold plate (210). The dimension of the transmit/receive arrangement (430) in the third (z) dimension is less than the selected dimension, so that a rear portion of the third volume lying adjacent the transmit/receive arrangement (430) is not occupied. A beamformer arrangement (216) is physically located in the first volume, and electrically connected through the first cold plate (212) with the array of antenna elements and through the second cold plate (210) with the transmit/receive arrangement (430), for transmitting and receiving electromagnetic signals by way of the antenna elements and the controllable transmit/receive arrangement (430). A control module (of set 224) is located in the second volume (V2) or in each of the second volumes, and communicates or communicate with the transmit/receive arrangement (430), for controlling the transmission and reception of the electromagnetic signals. The control module (of set 224) is in thermal communication with the first (218b1) and second (218b2) walls of the wall pair (218a, 218b, . . . ) defining its associated second volume. A power supply (432a, 434) for at least the transmit/receive arrangement (430) lies in the rear portion of the third volume (V3).

What is claimed is:

1. An array antenna, comprising:
   a first cold plate defining first and second broad sides, said first cold plate being generally planar and extending in first and second dimensions;
   a second cold plate defining first and second broad sides, said second cold plate being generally planar and extending in said first and second dimensions, said first broad side of said second cold plate lying generally parallel with said second broad side of said first cold plate and spaced therefrom to define a generally planar first volume;
   a plurality of cold plate wall pairs, each of said wall pairs including first and second walls, each of said walls of each of said wall pairs being generally planar and extending in said first dimension and in a third dimension, an edge of each of said first and second walls being affixed to said second broad side of said second cold plate at spaced-apart locations, to thereby define a plurality of third volumes lying between mutually adjacent walls of adjacent ones of said wall pairs, each of said third volumes being generally three-dimensional, with the largest dimension of each of said third volumes extending parallel with said first dimension, and each of said third volumes extending in said third dimension by the same distance from said second broad side of said second cold plate;
   a plurality of apertures provided in each of the first and second walls of the plurality of cold plate wall pairs, the apertures being open along edges of the first and second walls and extending into the interior of each of the first and second walls along the third dimension, wherein the apertures defining second volumes adapted for receiving additional electronic components;
   a generally planar array of antenna elements supported on said first broad side of said first cold plate, and in thermal communication therewith;
   a controllable transmit/receive arrangement physically juxtaposed with said second side of said second cold plate within each of said third volumes, said transmit/receive arrangement being in thermal communication with said second side of said second cold plate; and
   a beamformer arrangement physically located in said first volume, and electrically connected through said first cold plate with said array of antenna elements and through said second cold plate with said transmit/receive arrangement, for transmitting and receiving electromagnetic signals by way of said antenna elements and said controllable transmit/receive arrangement.

2. An array antenna according to claim 1, further comprising:
   a control module located in each of said second volumes, said control module communicating with said transmit/receive arrangement, for controlling the transmission and reception of said electromagnetic signals, said control module being in thermal communication with the first and second walls of the wall pair defining its associated second volume.

3. An array antenna according to claim 2, wherein:
   each transmit/receive arrangement has an extent in said third dimension smaller than said distance, so that a portion of said third volume is not filled by said transmit/receive arrangement; and
   further comprising at least a power supply for said transmit/receive arrangement located in said portion of said third volume.

4. An array antenna according to claim 2, wherein:
each transmit/receive arrangement has an extent in said third dimension smaller than said distance, so that a portion of said third volume is not filled by said transmit/receive arrangement; and
further comprising at least a power supply located in said portion of said third volume, said power supply being for said transmit/receive arrangement and an adjacent control module.

5. A subarray of an array antenna, said subarray comprising:
a first cold plate defining first and second broad sides, said first cold plate being generally planar and extending in first and second dimensions;
a second cold plate defining first and second broad sides, said second cold plate being generally planar and extending in said first and second dimensions, said first broad side of said second cold plate lying generally parallel with said second broad side of said first cold plate and spaced therefrom to define a generally planar first volume;
a plurality of cold plate wall pairs, each of said wall pairs including first and second walls, each of said walls of each of said wall pairs being generally planar and extending in said first dimension and in a third dimension, an edge of each of said first and second walls being affixed to said second broad side of said second cold plate at spaced-apart locations so that each of said wall pairs extends generally perpendicular to said second broad side of said second cold plate, to thereby define a plurality of elongated third volumes lying between mutually adjacent walls of adjacent ones of said wall pairs, with the direction of elongation of each of said third volumes extending parallel with said first dimension, and each of said third volumes extending in said third dimension by a selected distance from said second broad side of said second cold plate;
a plurality of apertures provided in each of the first and second walls of the plurality of cold plate wall pairs, the apertures being open along edges of the first and second walls and extending into the interior of each of the first and second walls along the third dimension, wherein the apertures defining second volumes;
a generally planar array of antenna elements supported on said first broad side of said first cold plate, and in thermal communication therewith;
at least one controllable transmit/receive arrangement physically juxtaposed with said second side of said second cold plate within each of said third volumes and in thermal communication therewith, the dimension of said transmit/receive arrangement in said third dimension being less than said selected dimension, so that a rear portion of said third volume lying adjacent said transmit/receive arrangement is not occupied;
a beamformer arrangement physically located in said first volume, and electrically connected through said first cold plate with said array of antenna elements and through said second cold plate with said transmit/receive arrangement, for transmitting and receiving electromagnetic signals by way of said antenna elements and said controllable transmit/receive arrangement; and
a control module located in each of said second volumes, and communicating with said transmit/receive arrangement, for controlling the transmission and reception of said electromagnetic signals, said control module being in thermal communication with the first and second walls of the wall pair defining its associated first volume; and
a power supply for at least said transmit/receive arrangement lies in said rear portion of said third volume.

* * * * *